(12) United States Patent
Vitebskiy et al.

(10) Patent No.: US 12,092,848 B2
(45) Date of Patent: Sep. 17, 2024

(54) LAYERED SHEET POLARIZERS AND ISOLATORS HAVING NON-DICHROIC LAYERS

(71) Applicants: Ilya M. Vitebskiy, Beavercreek, OH (US); Andrey Chabanov, Helotes, OH (US); Igor Anisimov, Oakwood, OH (US); Nicholaos Limberopoulos, Dayton, OH (US); Carl Pfeiffer, Beavercreek, OH (US)

(72) Inventors: Ilya M. Vitebskiy, Beavercreek, OH (US); Andrey Chabanov, Helotes, OH (US); Igor Anisimov, Oakwood, OH (US); Nicholaos Limberopoulos, Dayton, OH (US); Carl Pfeiffer, Beavercreek, OH (US)

(73) Assignee: Board of Regents, The University of Texas System, Austin, TX (US)

( * ) Notice: Subject to any disclaimer, the term of this patent is extended or adjusted under 35 U.S.C. 154(b) by 153 days.

(21) Appl. No.: 16/660,742

(22) Filed: Oct. 22, 2019

(65) Prior Publication Data
US 2020/0124779 A1 Apr. 23, 2020

Related U.S. Application Data

(60) Provisional application No. 62/748,888, filed on Oct. 22, 2018.

(51) Int. Cl.
*G01J 3/26* (2006.01)
*G02B 5/30* (2006.01)
*G02F 1/09* (2006.01)
*H01Q 15/24* (2006.01)

(52) U.S. Cl.
CPC ............ *G02B 5/3041* (2013.01); *G02F 1/093* (2013.01); *G01J 3/26* (2013.01); *G02B 5/3016* (2013.01); *G02B 5/305* (2013.01); *G02B 5/3058* (2013.01); *H01Q 15/24* (2013.01)

(58) Field of Classification Search
CPC .... G02B 5/30–3091; G02B 27/28–288; G02B 6/29358; G02B 6/29359; G02B 5/3058; G02F 1/09–0955; G02F 1/133548; G02F 1/133528–13355; G01J 3/26; G01J 2003/262; G01J 2003/265; G01J 2003/267
USPC ........................................ 359/484.02–484.1
See application file for complete search history.

(56) References Cited

U.S. PATENT DOCUMENTS

| | | | |
|---|---|---|---|
| 6,451,414 B1 * | 9/2002 | Wheatley | B32B 17/10018 359/359 |
| 2003/0117706 A1 * | 6/2003 | Okubo | G02B 1/02 359/484.03 |
| 2006/0119937 A1 * | 6/2006 | Perkins | G02B 5/3058 359/485.05 |

(Continued)

*Primary Examiner* — Ryan S Dunning
(74) *Attorney, Agent, or Firm* — Thomas | Horstemeyer, LLP

(57) ABSTRACT

A layered sheet polarizer including a multilayered structure having multiple transparent, low-absorption layers, the transparent, low-absorption layers including first layers having a relatively high index of refraction and second layers having a relatively low index of refraction, the first and second layers being arranged in an alternating manner within the structure so as to form resonator structures, and a dichroic layer positioned within the multilayered structure.

6 Claims, 9 Drawing Sheets

(56) References Cited

U.S. PATENT DOCUMENTS

| | | | |
|---|---|---|---|
| 2008/0278811 A1* | 11/2008 | Perkins | G02B 5/3058 |
| | | | 359/485.05 |
| 2009/0101192 A1* | 4/2009 | Kothari | H01L 31/02165 |
| | | | 136/246 |
| 2014/0340728 A1* | 11/2014 | Taheri | G02F 1/133528 |
| | | | 359/250 |
| 2016/0109628 A1* | 4/2016 | Weber | G02B 5/223 |
| | | | 359/359 |
| 2021/0149099 A1* | 5/2021 | Sonnek | B32B 27/08 |

* cited by examiner

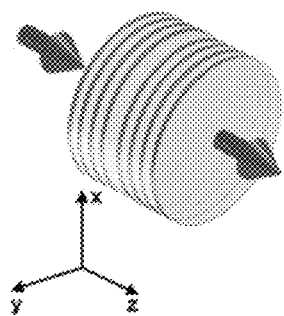 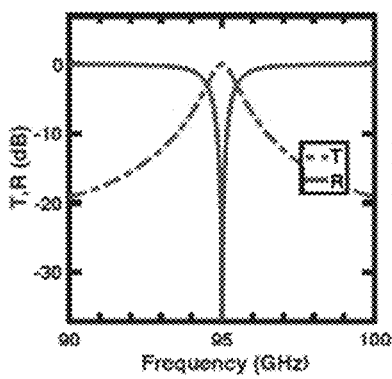 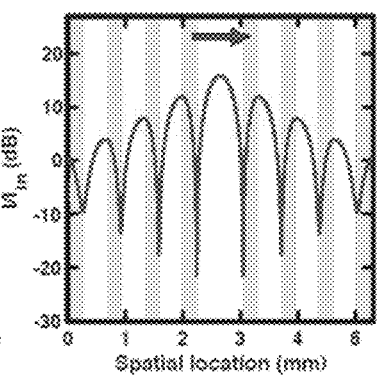
FIG. 5A     FIG. 5B     FIG. 5C
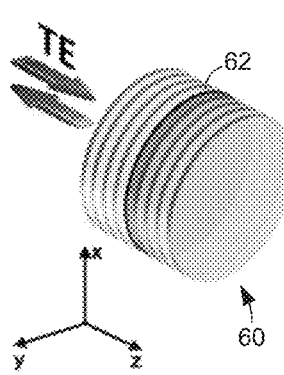 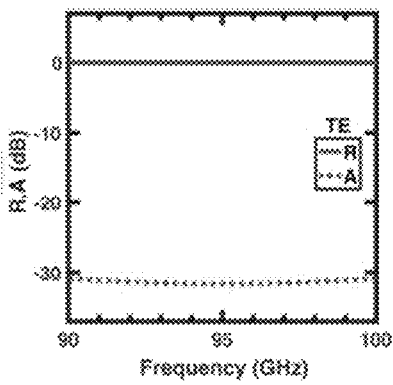 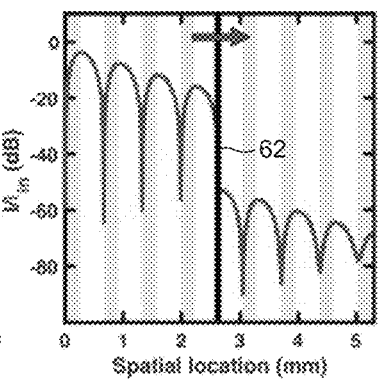
FIG. 6A     FIG. 6B     FIG. 6C

LAYERED SHEET POLARIZERS AND ISOLATORS HAVING NON-DICHROIC LAYERS

CROSS-REFERENCE TO RELATED APPLICATION

This application claims priority to U.S. Provisional Application Ser. No. 62/748,888, filed Oct. 22, 2018, which is hereby incorporated by reference herein in its entirety.

NOTICE OF GOVERNMENT-SPONSORED RESEARCH

This invention was made with Government support under grant contract numbers FA8650-17-C-1026 awarded by U.S. Air Force/Air Force Materiel Command, FA9550-15-F-0001 and FA-9550-16-1-0058 awarded by the Air Force Office of Scientific Research. The Government has certain rights in the invention.

BACKGROUND

Absorptive polarizers utilize linear dichroism of natural or artificial materials to transmit only a desired polarization component of the input light, while rejecting the undesired polarization component. Strong linear dichroism can be achieved with liquid crystals, stretched polymer sheets, subwavelength wire-grid structures, arrays of elongated metallic nanoparticles embedded in glass, and other natural and artificial dichroic media. A typical absorptive polarizer comprises a plate or a film having highly anisotropic in-plane absorption. Such polarizers are often referred to as sheet polarizers.

Major advantages of absorptive sheet polarizers typically include low-profile, broadband performance, wide acceptance angles for the desired polarization, and virtually omni-directional rejection of undesired polarization. One common problem with absorptive sheet polarizers, however, is severe power limitations due to absorption-related overheating.

In view of the above discussion, it can be appreciated that it would be desirable to have absorptive polarizers that comprise the advantages of current dichroic sheet polarizers but that exhibit enhanced power-handling capabilities.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 5A is a schematic view of a resonant multilayer cavity of multilayered structure for layered sheet polarizers.

FIG. 5B is a graph that shows the simulated spectral transmittance (dashed line) and reflectance (solid line) for the multilayered structure of FIG. 5A at a cavity resonance frequency of 95 GHz.

FIG. 5C is a graph that shows the spatial intensity distribution at the cavity resonance frequency of 95 GHz.

FIG. 6A is a schematic view of an embodiment of a reflective layered sheet polarizer including a dichroic layer.

FIG. 6B is a graph that shows the simulated spectral reflectance (solid line) and absorptance (dotted line) for the polarizer of FIG. 6A at a cavity resonance frequency of 95 GHz for the TE polarization in the forward propagation FIG. 6C is a graph that shows the spatial intensity distribution for the polarizer of FIG. 6A at a cavity resonance frequency 95 GHz for the TE polarization in the forward propagation direction.

DETAILED DESCRIPTION

As described above, it would be desirable to have absorptive polarizers that comprise the advantages of current dichroic sheet polarizers but that exhibit enhanced power-handling capabilities. Disclosed herein are layered sheet polarizers that provide a significant enhancement of the polarization ratio and power-handling capability of dichroic sheet polarizers, while preserving desired features, such as omnidirectional and broadband rejection of the input light with unwanted polarization, low-profile, unlimited aperture, and low cost. In some embodiments, a layered sheet polarizer comprises one or more dichroic sheets or layers that are incorporated into a multilayered structure comprising a plurality of transparent, low-absorbance sheets or layers. Also disclosed are integrated layered sheet isolators that comprise one or more layered sheet polarizers in combination with a Faraday rotator.

In the following disclosure, various specific embodiments are described. It is to be understood that those embodiments are example implementations of the disclosed inventions and that alternative embodiments are possible. Such alternative embodiments can include hybrid embodiments that include features from different embodiments. All such embodiments are intended to fall within the scope of this disclosure.

The disclosure that follows begins with a discussion of layered sheet polarizers and concludes with a discussion of layered sheet isolators that incorporate a layered sheet polarizer.

Layered Sheet Polarizers

Figure 1A:
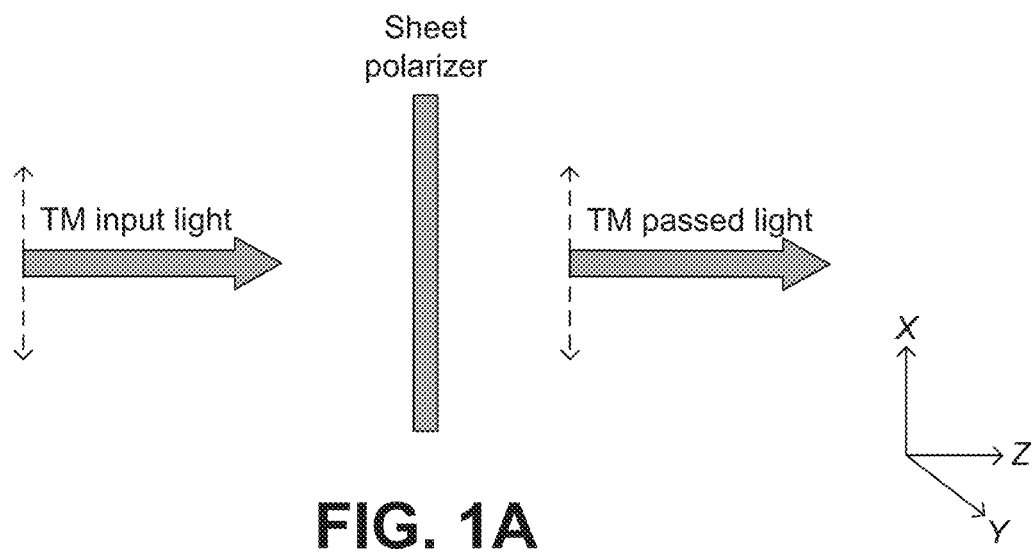
FIG. 1A is a schematic diagram illustrating operation of a conventional sheet polarizer shown transmitting a desired TM-polarized component of input light.
Figure 1B:
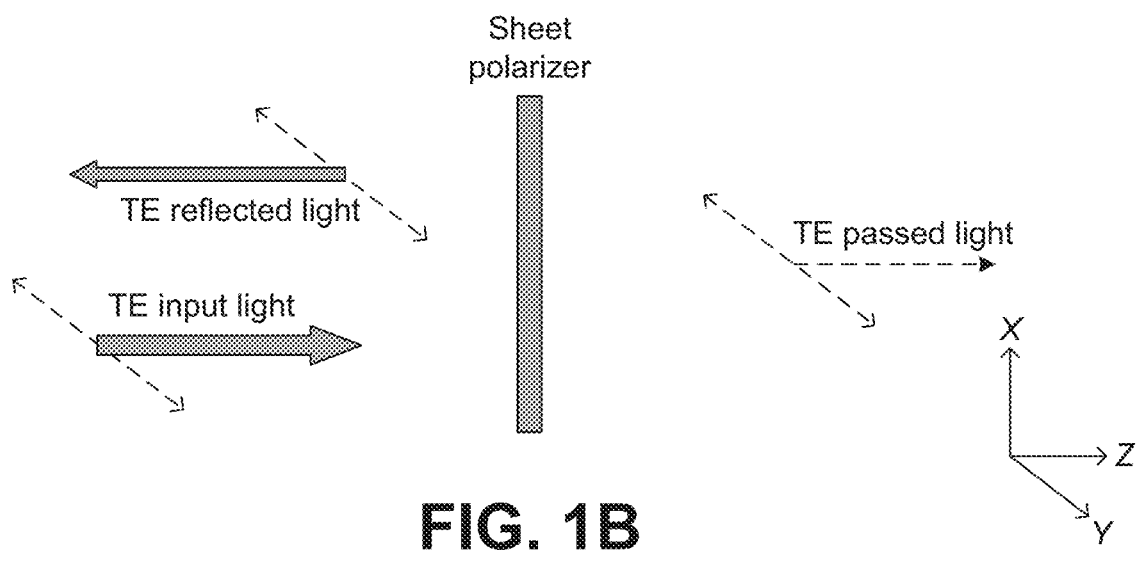
FIG. 1B is a schematic diagram illustrating operation of a conventional sheet polarizer shown blocking an undesired TE-polarized component of input light.

Disclosed herein are polarizers comprising at least one dichroic layer that is incorporated into a low-loss, multilayered structure. If removed from the structure, the dichroic layer would act as a conventional absorptive sheet polarizer that transmits light having a particular linear polarization (e.g., transverse-magnetic polarization (TM)), while partially absorbing and partially reflecting light having another linear polarization (e.g., transverse-electric polarization (TE)). This functionality is illustrated in FIGS. 1A and 1B. The transmission properties of a layered sheet polarizer incorporating a multilayered structure, however, is very different. In the following discussion, various layered sheet polarizer configurations, as well as the particular functionalities they provide, are described. Each disclosed configuration provides a narrowband resonant transmittance for the desired polarization component of the input light, while providing a broadband, omnidirectional, and greatly enhanced rejection of the undesired linear polarization.

Figure 2:
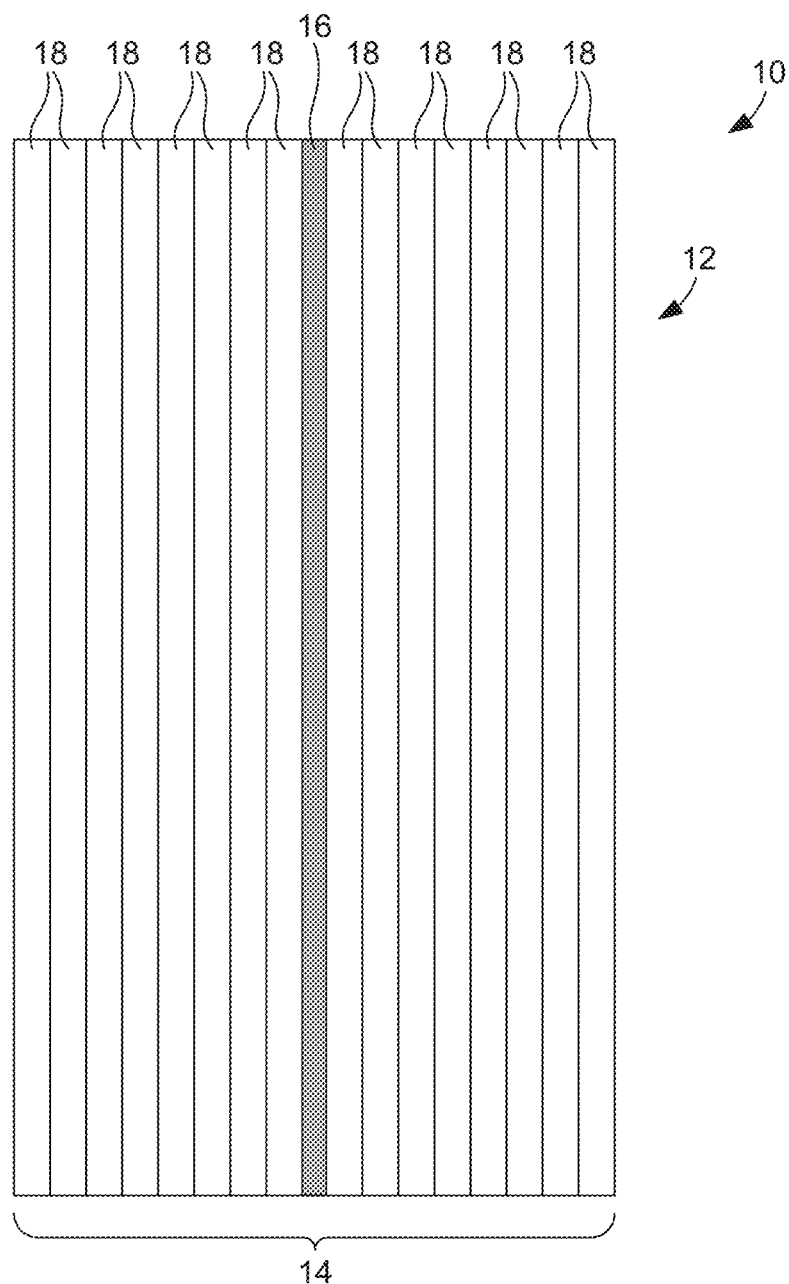
FIG. 2 is a side view of an embodiment of a layered sheet polarizer.

FIG. 2 illustrates an example construction for a layered sheet polarizer 10 that is generally representative of the disclosed layered sheet polarizers. As shown in this figure, the layered sheet polarizer 10 generally comprises multiple layers 12 that together form a stack of layers that is referred to herein as a multilayered structure 14. The various layers 12 of the multilayered structure 14 include at least one dichroic layer 16 as well as multiple transparent, low-absorption layers 18 that are positioned on both sides of the dichroic layer. As used herein, the term "low-absorption layer" means any layer having a loss tangent of less than 0.01. Each of the layers 12 can, for example, be configured as a thin circular disc.

The dichroic layer 16 can have various configurations. By way of example, the dichroic layer 16 can comprise a liquid crystal, a stretched polymer sheet, a wire-grid structure, an array of elongated metallic nanoparticles embedded in glass, or any other uniform or heterogeneous optical material having strong in-plane dichroism and, therefore, being configured to transmit only light rays having a particular linear polarization. As used herein, the term "strong in-plane dichroism" means that the polarization extinction ratio between two orthogonal linearly polarized states being at least 1000. The strong in-plane dichroism implies that the absorption coefficient for TE polarization is much stronger than that for TM polarization. In some embodiments, the dichroic layers 16 each is a subwavelength layer that has an optical thickness that is less than the wavelength of electromagnetic waves (e.g., light) with which the layered sheet polarizer is used.

As is apparent from FIG. 2, the dichroic layer 16 is positioned within the multilayered structure 14 such that there are multiple transparent, low-absorption layers 18 on each side of the dichroic layer. In the specific example of FIG. 2, the dichroic layer 16 is positioned in the middle of the multilayered structure 14 such that there is an equal number of transparent, low-absorption layers 18 provided on both sides of the dichroic layer. More particularly, there are eight transparent, low-absorption layers 18 provided on each side of the dichroic layer 16. In other embodiments, however, the dichroic layer 16 can be positioned elsewhere within the multilayered structure 14. In addition, there can be more than one dichroic layer present in the multilayered structure 14 (e.g., two dichroic layers, three dichroic layers, four dichroic layers, etc.). As described below, the number of dichroic layers 16, as well their location within the multilayered structure 14, changes the way in which the layered sheet polarizer 10 operates.

In some embodiments, the transparent, low-absorption layers 18 are composed of alternating layers having different indices of refraction. For example, the transparent, low-absorption layers 18 can comprise alternating first and second layers that are made of first and second materials, respectively, having different indices of refraction. As such, the groups or "stacks" of transparent, low-absorption layers 18 on either side of a dichroic layer 16 act as resonator structures (cavity resonators) in which the electromagnetic radiation experiences multiple reflections at layers' interfaces before passing through the layered sheet polarizer 10. In some embodiments, the alternating layers have highly different refractive indices. By way of example, the first layer of each pair of adjacent layers can have a refractive index of 1-2, while the second layer of the pair of adjacent layers has a refractive index of 3-6, or vice versa. Such a pattern of pairs of layers having different refractive indices can be repeated throughout each grouping of low-absorption layers 18.

The composition of the transparent, low-absorption layers 18 can vary depending upon the application and the frequency range used. In some embodiments, the transparent, low-absorption layers 18 are made of oxide materials such as silica or sapphire. In other embodiments, the transparent, low-absorption layers 18 are made of low-loss microwave ceramics or glass. In still other embodiments, one or more of the layers can comprise air gaps that separate adjacent solid layers. Accordingly, as used herein, the term "transparent, low-absorption layer" applies to both layers of physical material as well as air gaps. Irrespective of the material that is used (or not used) for each transparent, low-absorption layer 18, each such layer has an optical thickness of approximately one-quarter the wavelength of the electromagnetic waves with which the layered sheet polarizer 10 is used. In some embodiments, the transparent, low-absorption layers 18 can each have a physical thickness of approximately 100 nm (e.g., for visible and infrared light) to 10 mm (e.g., for microwaves).

As noted above, there are eight transparent, low-absorption layers 18 provided on each side of the dichroic layer 16 in the illustrative example of FIG. 2. The number of transparent, low-absorption layers 18 comprised by the layered sheet polarizer 10 can be varied, however, depending upon the application. By way of example, the layered sheet polarizer 10 can comprise approximately 4 to 100 transparent, low-absorption layers 18.

The layered sheet polarizer 10 can be fabricated using various methods. In some embodiments, each layer of the multilayered structure 14 comprising a physical material can be formed in situ using an appropriate thin film deposition technique. Such a technique is especially useful in embodiments in which the various layers 12 are very thin (e.g., for visible and infrared light applications). In other embodiments, each layer can be separately fabricated, polished, and combined or adhered together to form the multilayered structure 14 (e.g., for microwave applications).

Operation of the layered sheet polarizer, and what happens to the rejected polarization component, depends upon the particular configuration of the multilayered structure 14, including the number and the location of the dichroic layers within the structure. Below, three qualitatively different cases (cases A-C) are described and specific embodiments are identified for each.

A. Reflective Layered Sheet Polarizer.

In this case, the undesired polarization component of the input light can be mostly reflected by the structure (see FIG. 3A), even if the stand-alone dichroic layer exhibits significant absorption. As a consequence, the entire structure acts as a reflective layered sheet polarizer. At first glance, the reflective layered sheet polarizer acts similarly to a beam-splitting polarizer by transmitting the desired polarization, while deflecting (reflecting in this case) the other polarization component. There are, however, two major differences. Firstly, the disclosed layered sheet polarizer uses a dichroic layer to produce the desired effect. More importantly, the rejection of the undesired polarization component by the disclosed reflective layered sheet polarizer is broadband and omnidirectional, whereas the rejection provided by a typical beam-splitting polarizer is dependent upon the input light wavelength and direction of incidence. The strong broadband reflectivity of the undesired polarization component can dramatically reduce the absorption-related heating and, thereby, significantly increase the power-handling capability of the polarizer. FIG. 6 illustrates a numerical example of a reflective layered sheet polarizer comprising a single dichroic layer (represented with a dark line in the special location graph on the right).

B. Absorptive Layered Sheet Polarizer.

In this case, the undesired polarization component of the input light can be mostly absorbed by the stack with negligible reflection (see FIG. 3B), even if the stand-alone dichroic layer provides partial absorption and partial reflection of the undesired polarization. A nearly perfect absorption (as opposed to partial absorption and partial reflection) of undesired polarization component can be critically important for some applications, such as optical isolation. Contrary to the case of a stand-alone dichroic layer, the enhanced absorption of the layered sheet polarizer is narrowband due to its resonant nature. Away from the resonant frequency, both the allowed (TM) and the blocked (TE) polarization components are reflected by the layered sheet polarizer. The rejection of the undesired polarization component is broadband, omnidirectional, and strongly enhanced, compared to the case of a stand-alone dichroic layer. An optimal design of an absorptive layered sheet polarizer can involve more than one dichroic layer. In the numerical example shown in FIG. 7, an absorptive layered sheet polarizer is used with three identical dichroic layers.

C. Asymmetric Reflective/Absorptive Layered Sheet Polarizer.

Figure 4A:
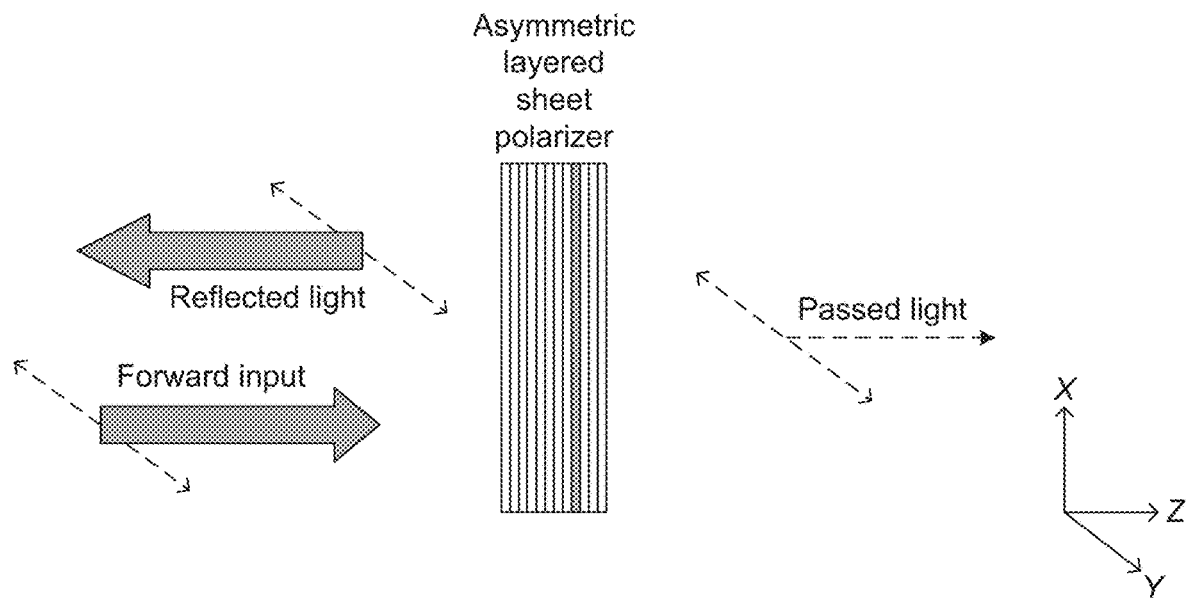
FIG. 4A is a schematic diagram illustrating operation of an asymmetric reflective/absorptive layered sheet polarizer in reflecting an undesired component of forward-propagating input light.
Figure 4B:
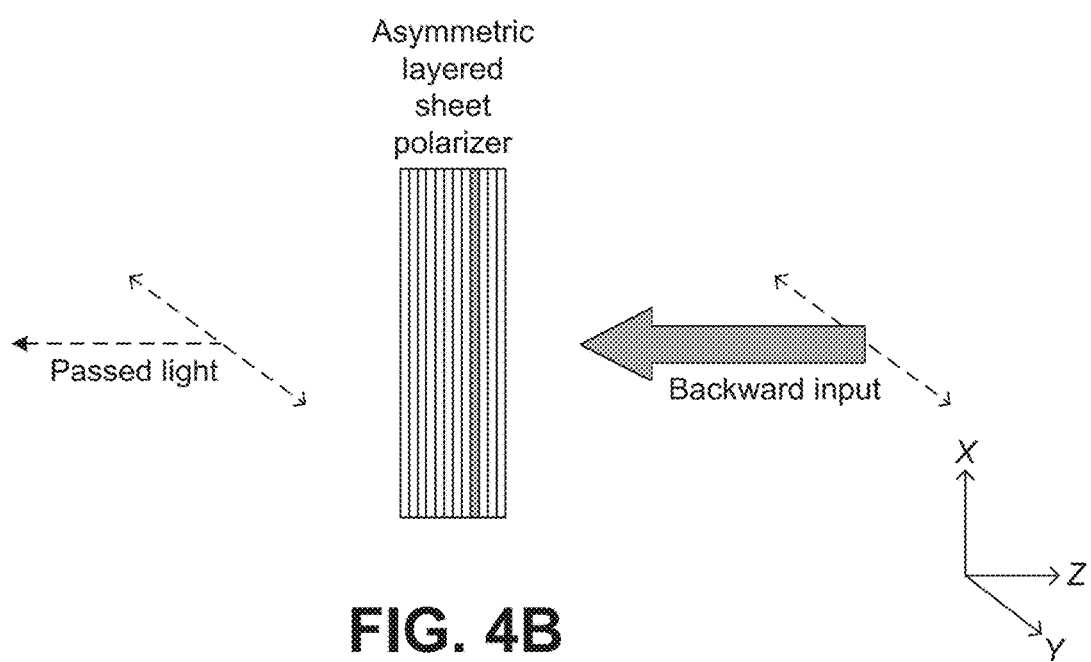
FIG. 4B is a schematic diagram illustrating operation of the asymmetric reflective/absorptive layered sheet polarizer of FIG. 4A in absorbing an undesired component of backward-propagating input light.

In this case, the blocked polarization component of the light incident on one side of the layered sheet polarizer (forward-propagating wave) can be mostly reflected by the layered sheet polarizer, while the blocked polarization component of the light incident on the opposite side of the layered sheet polarizer (backward-propagating wave) can be mostly absorbed by the layered sheet polarizer (see FIGS. 4A and 4B). The allowed polarization component (TM) is equally transmitted in either direction in accordance with the reciprocity principle. The high absorption of the backward-propagating light with the TE polarization and the high transmittance of the TM polarization component of light propagating in either direction are both narrowband due to their resonant nature. Away from the resonant frequency, both the TE and TM polarization components are reflected by the layered sheet polarizer regardless of the direction of incidence. Such an asymmetric reflective/absorptive layered sheet polarizer can be particularly useful when high-intensity light is only incident on one side of the multilayered structure (the forward-propagating light), which is usually the case. The high-intensity forward-propagating input light with undesired polarization is reflected back to space without causing any heat related problems. At the same time, strong resonant absorption (with negligible reflection) of the backward-propagating light can be essential for some applications, such as optical isolation as illustrated in FIG. 11. The optimal design of an asymmetric reflective/absorptive layered sheet polarizer can involve more than one dichroic layer. In the numerical example shown in FIG. 8, and in experimental measurements described in relation to FIG. 10, an asymmetric reflective/absorptive layered sheet polarizer is used with two identical dichroic layers.

In each of the above cases A-C, the transmission characteristics of the input wave with the allowed TM polarization are similar to those of the host layered structure without any dichroic layers (see FIG. 5). Specifically, in each case, there is strong resonant transmittance and strong off-resonance reflectance, as illustrated in FIG. 5C. The changes caused by the addition of the dichroic layer(s) are negligible.

Simulations were performed to evaluated the above-described layered sheet polarizers. Dichroic layers were incorporated into the low-loss layered structure shown in FIG. 5. The difference between the reflective and absorptive layered sheet polarizers is determined by the number and location of the dichroic layer(s), as shown in FIGS. 6 and 7. The asymmetric reflective/absorptive layered sheet polarizer in FIG. 7 involves two identical dichroic layers. The use of two dichroic layers instead of one greatly enhances the forward reflectance, the backward absorbance, and the polarization ratio of the asymmetric layered sheet polarizer, as seen in FIGS. 8 and 9.

The various layered sheet polarizer embodiments described in relation to FIGS. 3-10, and the results they provide, will now be described.

Figure 3A:
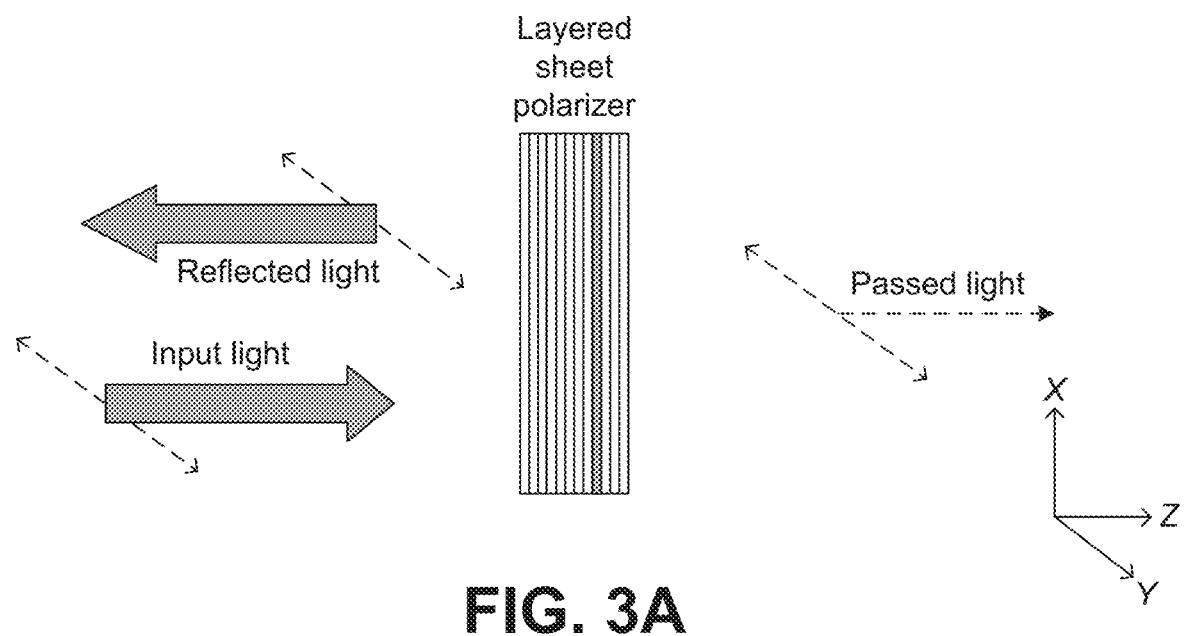
FIG. 3A is a schematic diagram illustrating operation of a reflective layered sheet polarizer in reflecting an undesired component of input light.
Figure 3B:
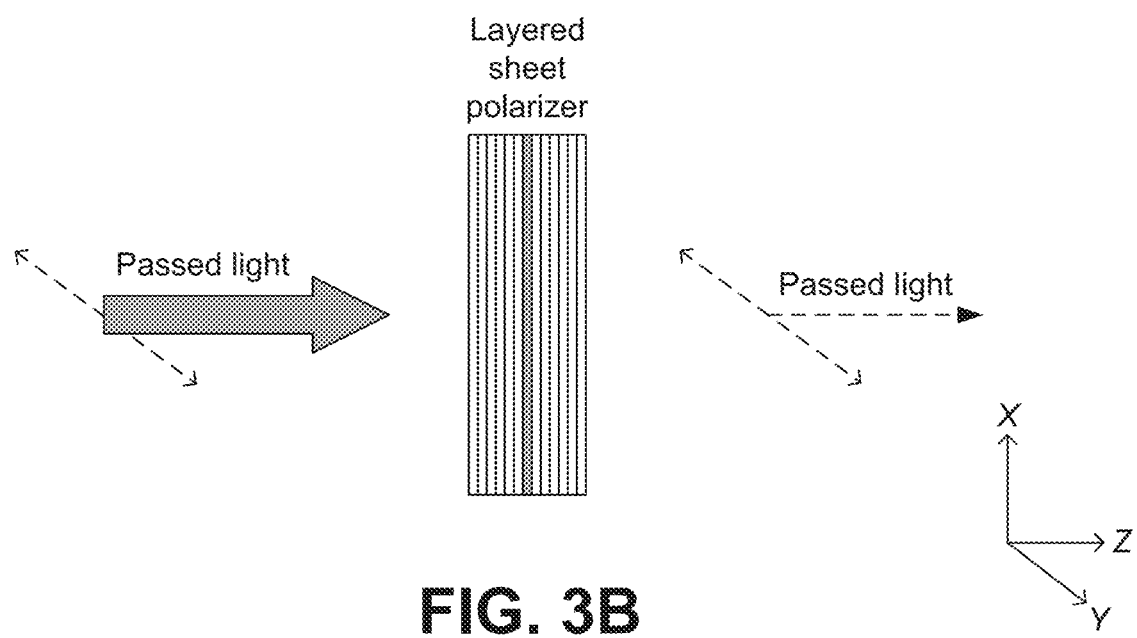
FIG. 3B is a schematic diagram illustrating operation of an absorptive layered sheet polarizer in absorbing an undesired component of input light.

FIGS. 3A and 3B illustrates the functionality of a reflective layered sheet polarizer and an absorptive layered sheet polarizer, respectively. The incident light has the undesired TE polarization. Numerical examples for these two cases are presented in FIGS. 6 and 7, respectively.

FIGS. 4A and 4B together illustrate the functionality of an asymmetric reflective/absorptive layered sheet polarizer. The incident light has the undesired TE polarization. In FIG. 4A, the layered sheet polarizer reflects the forward-propagating TE-polarized input light, while in FIG. 4B, the layered sheet polarizer absorbs the backward-propagating TE-polarized input light. The nearly total absorption of the backward propagating TE-polarized input light only occurs in the vicinity of the resonant frequency. At the same resonant frequency, the allowed TM-polarized input light (not shown) is equally transmitted in either direction, in accordance with the reciprocity principle. Away from the resonance frequency, the input light is reflected back to space for both the forward and backward incidence, regardless of polarization. A numerical example of the transmission dispersion for the asymmetric reflective/absorptive layered sheet polarizer is presented in FIG. 8 for the blocked TE polarization and in FIG. 5 for the allowed TM polarization.

FIG. 5A illustrates a lossless layered structure comprising a periodic stack of layers having a half-wavelength defect in the center of the structure. FIG. 5B shows a simulated resonant field distribution $|E(z)|^2$ inside the layered structure, while FIG. 5C shows a simulated frequency dependence of the transmittance (T) and reflectance (R) of the layered structure in the vicinity of the transmission resonance. This layered structure was used as a host structure for both the symmetric and asymmetric layered sheet polarizers shown in FIGS. 6-8. The addition of one or more dichroic layers to the structure does not noticeably affect the light with the allowed TM polarization. In other words, the graphs of FIGS. 5B and 5C change insignificantly in the cases of the layered sheet polarizers shown in FIGS. 6-8 provided that the incident wave (either forward or backward) has the TM polarization. In contrast, the effect of the dichroic layers on the blocked TE-polarized wave is dramatic, as shown in FIGS. 6-8, and may strongly depend upon the direction of incidence, as shown in FIG. 8.

FIG. 6A illustrates a reflective layered sheet polarizer 60 comprising a single dichroic layer 62 incorporated into the lossless host structure of FIG. 5A. FIG. 6B shows a simulated field distribution $|E(z)|^2$ for the blocked TE-polarized wave at the transmission resonance frequency for the allowed TM-polarized wave, and FIG. 5C shows a simulated frequency dependence of the reflectance (R) and absorbance (A) of the TE-polarized wave in the vicinity of the resonance frequency. The transmittance (T) of the blocked TE-polarization component (not shown) is about $10^{-7}$, which is three orders of magnitude lower than that of the stand-alone dichroic layer. The field distribution and the transmission dispersion for the allowed TM-polarized wave (not shown) are virtually the same as those shown in FIGS. 5B and 5C, respectively.

Figure 7A:
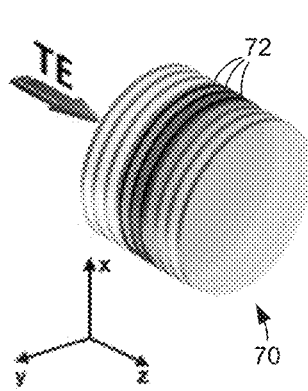
FIG. 7A is a schematic view of an embodiment of an absorptive light sheet polarizer comprising three dichroic layers.
Figure 7B:
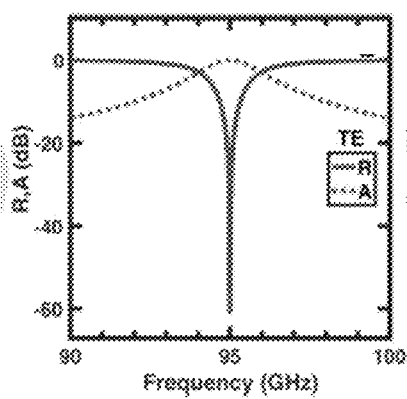
FIG. 7B is a graph that shows the simulated spectral reflectance (solid line) and absorptance (dotted line) for the polarizer of FIG. 7A at a cavity resonance frequency of 95 GHz for the TE polarization in the forward propagation direction.
Figure 7C:
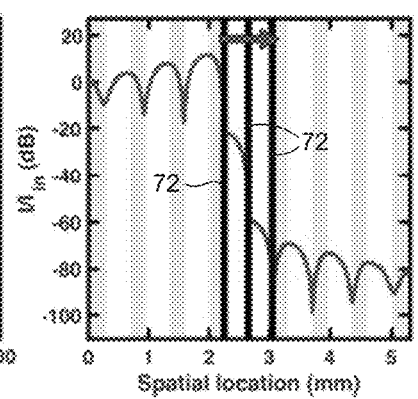
FIG. 7C is a graph that shows the spatial intensity distribution for the polarizer of FIG. 7A at a cavity resonance frequency of 95 GHz for the TE polarization in the forward propagation direction.

FIG. 7A illustrates an absorptive layered sheet polarizer 70 having three identical dichroic layers 72 inserted into the lossless host structure shown in FIG. 5A. A different number and location for the dichroic layers make the difference between a reflective and an absorptive layered sheet polarizer. FIG. 7B shows a simulated field distribution $|E(z)|^2$ for the undesired TE-polarized wave at the transmission resonance frequency of the desired TM-polarized wave, and FIG. 7C shows a simulated frequency dependence of the reflectance (R) and absorbance (A) of the TE-polarized wave in the vicinity of the resonance frequency. The transmittance (T) of the TE-polarization component in the vicinity of the resonance frequency is about $10^{-8}$, which is four orders of magnitude lower than that of the stand-alone dichroic layer. The field distribution and the transmission dispersion for the TM-polarized wave (not shown) are virtually the same as those shown in FIGS. 5B and 5C, respectively.

Figure 8A:
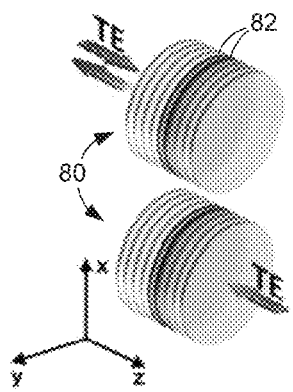
FIG. 8A is a schematic view of an embodiment of an asymmetric absorptive/reflective layered polarizer comprising two dichroic nanolayers.
Figure 8B:
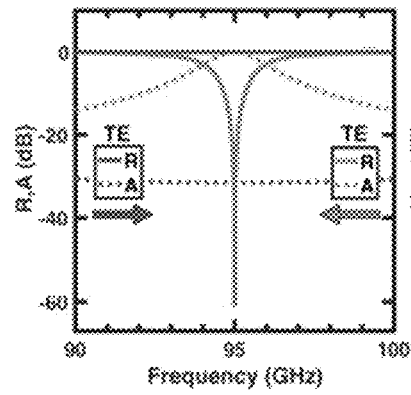
FIG. 8B is a graph that shows the simulated spectral reflectance (solid line) and absorptance (dotted line) for the polarizer of FIG. 8A at a cavity resonance frequency of 95 GHz for the TE polarization in the forward and backward propagation directions.
Figure 8C:
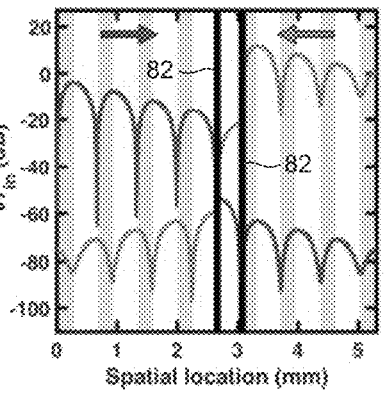
FIG. 8C is a graph that shows the spatial intensity distribution for the polarizer of FIG. 8A at the cavity resonance frequency 95 GHz for the TE polarization in the forward and backward propagation directions.

FIG. 8 illustrates an asymmetric reflective/absorptive layered sheet polarizer 80 comprising two dichroic layers 82 inserted into the lossless host structure of FIG. 5A. The asymmetry of the structure results in a huge difference between the cases of forward (left arrow) and backward (right arrow) incidence. Specifically, for the forward-propagating light, the layered sheet polarizer acts as a reflective resonant polarizer, while for the backward-propagating wave the polarizer acts as an absorptive resonant polarizer. FIG. 8B shows a simulated field distribution $|E(z)|^2$ for the blocked TE-polarized wave at the transmission resonance frequency of the allowed TM-polarized wave, and FIG. 8C shows a simulated frequency dependence of the reflectance (R) and absorbance (A) of the TE-polarized wave in the vicinity of the resonance frequency. For either direction of incidence, the transmittance (T) of the undesired TE-polarized wave (not shown) is below $10^{-7}$ at all frequencies. This implies orders of magnitude stronger extinction of the unwanted polarization component, compared to that provided by a single dichroic layer. The field distribution and the transmission dispersion for the allowed TM-polarized wave (not shown) are virtually the same as those shown in FIGS. 5B and 5C, respectively.

Figures 9A, 9B:
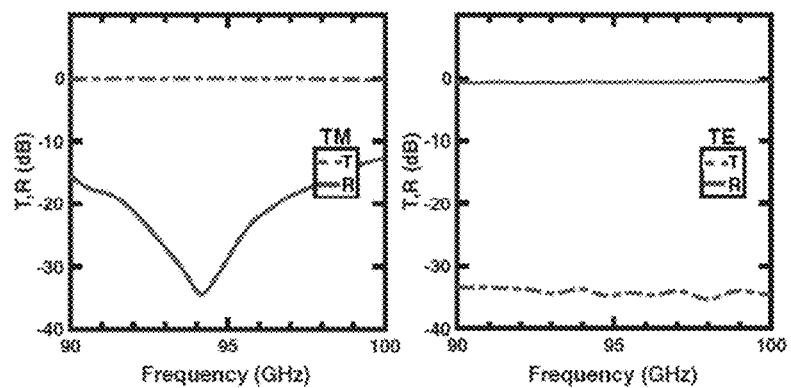
FIG. 9A is a graph that shows transmittance (dashed line) and reflectance (solid line) of a TM-polarized Gaussian beam for an aluminum wire grid on sapphire.
FIG. 9B is a graph that shows transmittance (dashed line) and reflectance (solid line) of a TE-polarized Gaussian beam for an aluminum wire grid on sapphire.

FIG. 9 shows the experimentally measured dispersion of the transmittance (T) and reflectance (R) of a dichroic layer. More particularly, FIG. 9A shows the allowed (TM) polarization, while FIG. 9B shows the blocked (TE) polarization. The dichroic layer was a 40-nm thick Al wire grid (WG) with periodicity of 20 μm and a 5:15 μm metal:space ratio on a 250 μm sapphire substrate.

Figures 10A, 10B, 10C:
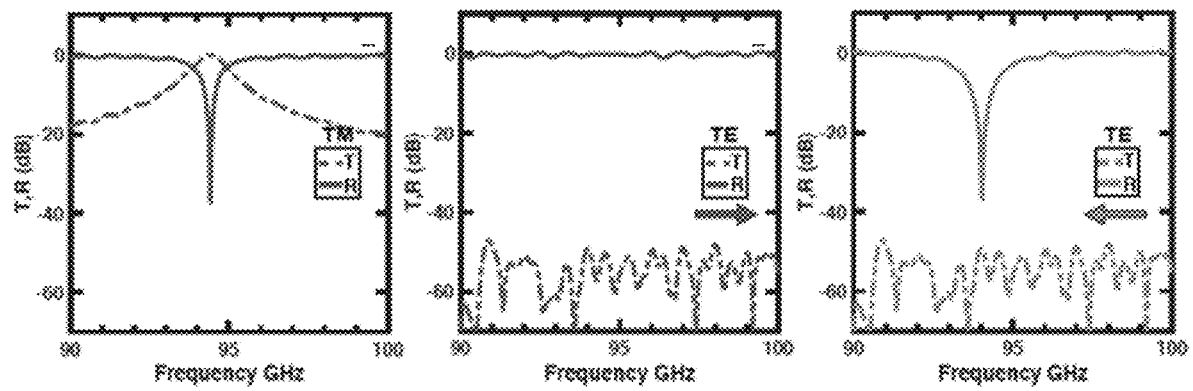
FIG. 10A is a graph that shows transmittance (dashed line) and reflectance (solid line) of a TM-polarized Gaussian beam for an asymmetric reflectance/absorbance layered sheet polarizer.
FIG. 10B is a graph that shows transmittance (dashed line) and reflectance (solid line) of a TM-polarized Gaussian beam incident to the right for the asymmetric reflectance/absorbance layered sheet polarizer.
FIG. 10C is a graph that shows transmittance (dashed line) and reflectance (solid line) of a TM-polarized Gaussian beam incident to the left for the asymmetric reflectance/absorbance layered sheet polarizer.

FIG. 10 shows the experimentally measured dispersion of the transmittance (T) and reflectance (R) of an asymmetric reflective/absorptive layered sheet polarizer, such as that shown in FIG. 8A, made with glass and sapphire layers having a loss tangent less than 0.005 in the vicinity of the transmission resonance frequency. FIG. 10A shows the allowed TM polarization for either direction of incidence, FIG. 10B shows the forward incidence for the undesired TE polarization, and FIG. 10C shows the backward incidence for the undesired TE polarization. The measured transmission characteristics for the both directions of incidence and the both polarizations are in a good agreement with the simulation results presented in FIGS. 5C and 8C. In particular, the results show an extreme asymmetry in the resonant absorption/reflection of the rejected TE polarization for two opposite directions of incidence, as well as orders of magnitude of enhancement of the polarization ratio for either direction of incidence.

Layered sheet polarizers of the types described above can provide orders of magnitude higher polarization ratio and much higher power-handling capabilities as compared to standard dichroic sheet polarizers, while preserving such desired features as omnidirectional and broadband rejection of the input light with unwanted polarization, low profile, unlimited aperture, and low cost. The disclosed layered sheet polarizers are highly scalable as they can be realized at any wavelength starting from the medium wavelength infrared (MWIR) and above. In addition, the disclosed layered sheet polarizers provide the only known solution for a broadband, wide-aperture, omnidirectional and conformal isolation.

Integrated Layered Sheet Isolators

Figure 11A:
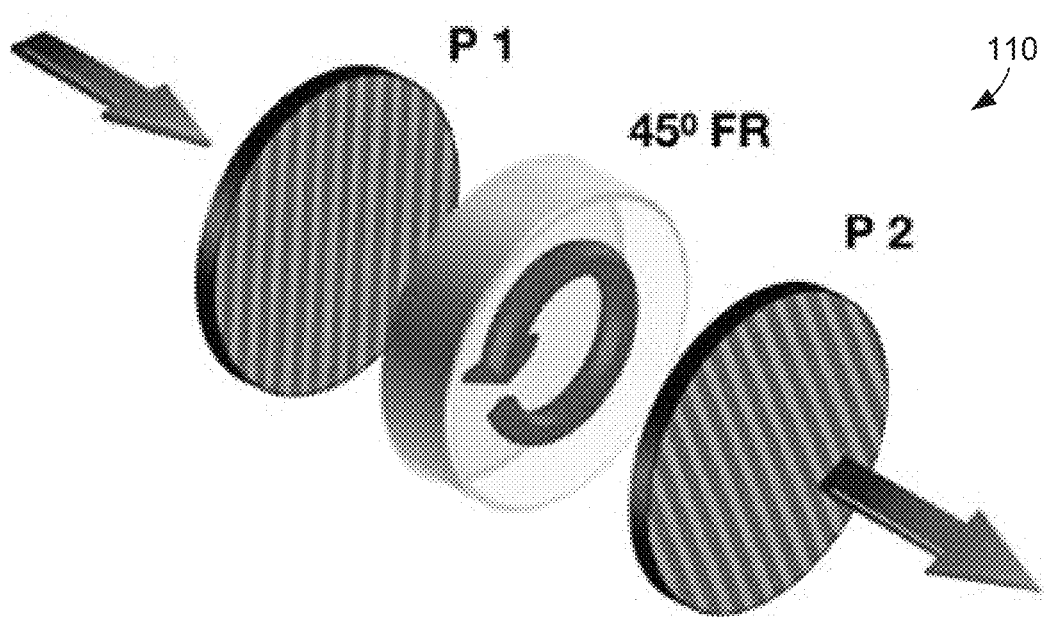
FIG. 11A is a schematic view of a layered sheet isolator illustrating a forward-propagating wave passing through the isolator.
Figure 11B:
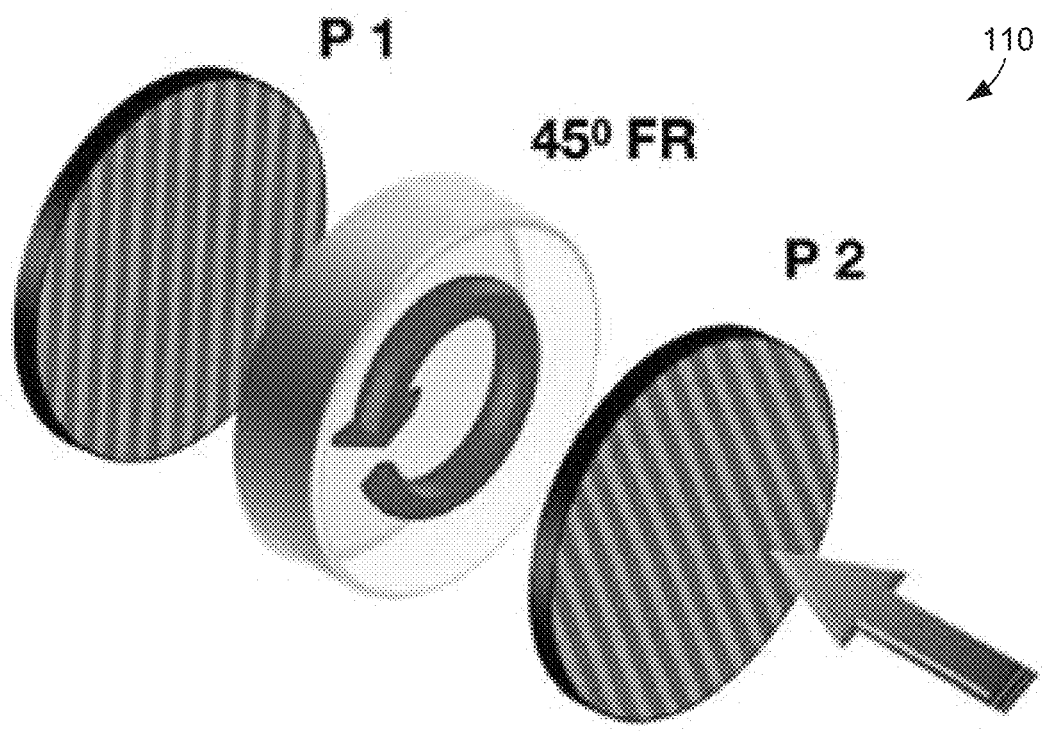
FIG. 11B is a schematic view of the layered sheet isolator of FIG. 11A illustrating a backward-propagating wave being blocked by the isolator.

Layered sheet polarizers having strong resonant absorption of the undesired (TE) polarization component enable the design and fabrication of integrated layered sheet isolators with unlimited aperture and omnidirectional broadband rejection of the backward-propagating waves. FIG. 11 illustrates a layered sheet isolator 110 that only transmits the forward-propagating TM-polarized input light (FIG. 11A). The light incident in the opposite direction is blocked (absorbed and/or reflected), regardless of its polarization (FIG. 11B). The nonreciprocal multilayered structure comprises an asymmetric reflective/absorptive layered sheet polarizer P1 (described in FIGS. 4 and 8), a layered sheet polarizer P2 having a 45° misalignment relative to P1, and a 45° Faraday rotator (45° FR) sandwiched between the two polarizers.

The asymmetric reflective/absorptive layered sheet polarizer P1 can be replaced with an absorptive sheet polarizer, described in FIGS. 3B and 7, or with any sheet polarizer, provided that the layered sheet polarizer P2 is absorptive. In any case, the wave that passes through the Faraday rotator 45° FR in the backward direction will be totally absorbed (not reflected) by at least one of the two layered sheet polarizers, P1 and/or P2. If both the layered sheet polarizers P1, P2 are even partially reflective for the light passed through the Faraday rotator 45° FR in the opposite direction, the layered sheet isolator 20 will fail to block the backward-propagating input wave. An optional metallic layer can be placed at the nodal point of the resonant electric field distribution, in which case the rejection of the backward incident wave with either polarization will be omnidirectional. At microwave frequencies, the metallic layer can be made of a ferromagnetic metal, in which case it will provide also the magnetic Faraday rotation.

An input wave having the proper linear polarization (the TM polarization for P1) and normally incident from the left on the layered sheet isolator 20 will pass through at the frequency of transmission resonance and the output wave polarization will be rotated clockwise by 45 degrees. The wave incident on the right interface of the layered sheet isolator 20 will be blocked regardless of the frequency, polarization, and, in the presence of a metallic layer in the nodal point of the resonant electric field distribution, direction of incidence. In the absence of the metallic layer, the stack will still block the backward-propagating light, but only at normal incidence, similar to standard free-space isolators. The high reflectivity of the input polarizer P1 for the forward-propagating TE-polarized light enhances the power-handling capabilities of the layered sheet isolator 20 by reducing absorption related heating. At the same time, the light incident on at least one of the two internal interfaces of polarizers P1 and/or P2 must be absorbed in order to block the backward-incident light.

Figure 12A:
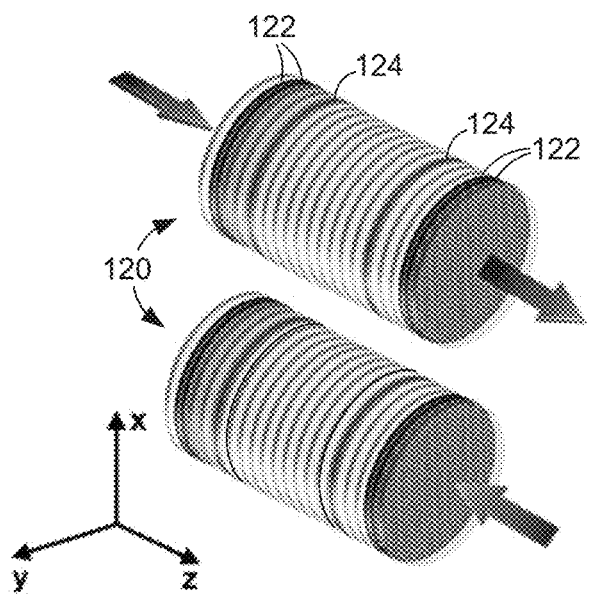
FIG. 12A is schematic view of an embodiment of an integrated layered sheet isolator.

FIG. 12A illustrates a layered sheet isolator 120 that is based on a single multilayer cavity and may be referred to as an integrated layered isolator. This integrated layered sheet isolator 120 was designed for the W-band and comprises dichroic layers 122 and magnetic layers 124 incorporated in a sapphire/quartz multilayer structure. The structure also includes two symmetric half-wave defect layers, located adjacent the magnetic layers 124, that provide a pair of resonant cavity-localized modes that enable a low-loss Faraday rotator. The dichroic layers 122 are characterized by the sheet resistances Rx=1 and Ry=15.6 Ω/sq, and the magnetic layers 124 are 11.65 μm thick strontium ferrite ($SrFe_{12}O_{19}$) layers with the permittivity $\epsilon$=36+i0:1, diagonal elements of the permeability tensor $\mu_{ii}$=1, specific Faraday rotation $\alpha$=700 deg/cm.

The position of the magnetic layers is determined by the following. Note that, at MMW frequencies, the nonreciprocal response is usually associated with the magnetic permeability tensor, whereas absorption is often caused by electrical conductivity of the magnetic material. This implies that the magnetic component of the electromagnetic wave is responsible for the nonreciprocal effects (such as Faraday rotation), while the electric component for the losses. Also note that, at the cavity resonance, the nodal planes of the electric field component coincide with the antinodal planes of the magnetic field component, and vice versa. Therefore, when a subwavelength magnetic layer (such as strontium ferrite) is positioned at the antinodal plane of the magnetic field (also the nodal plane of the electric field), the Faraday rotation is enhanced and the losses are suppressed at the same time. This approach can be utilized for any lossy magnetic material of considerable magnetic gyrotropy, provided that the gyrotropy is predominantly associated with the permeability tensor while the losses are caused by the electric conductivity. Such magnetic materials are available from microwave to long- and mid-infrared frequencies.

The two pairs of the (aligned) dichroic layers, making a 45° angle with each other, each act as the asymmetric polarizer. They reflect the TE-polarized component of the incoming wave and resonantly absorb the TE-polarized component of the wave passed the magnetic layers in either direction (FIGS. 12C and 12D). Note that the dichroic layers can adversely affect the Faraday rotation when positioned very close to the magnetic layer. On the other hand, placing them at the edges of the multilayer degrades their polarization contrast and power-handling capability.

Figure 12B:
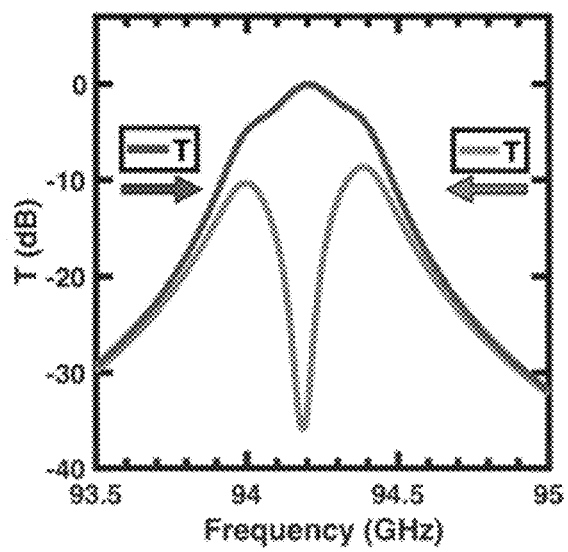
FIG. 12B is a graph that shows the simulated spectral transmittance in the forward and backward propagation directions in the vicinity of the cavity resonance for the integrated layered sheet isolator of FIG. 12A.
Figure 12C:
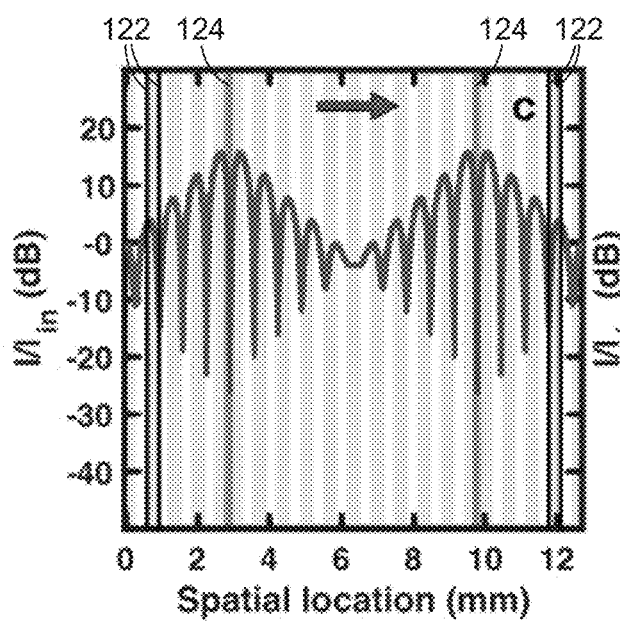
FIGS. 12C and 12D are graphs that show the corresponding spatial intensity distributions in the forward and backward directions, respectively, for the integrated layered sheet isolator of FIG. 12A at the resonance frequency 94.20 GHz.
Figure 12D:
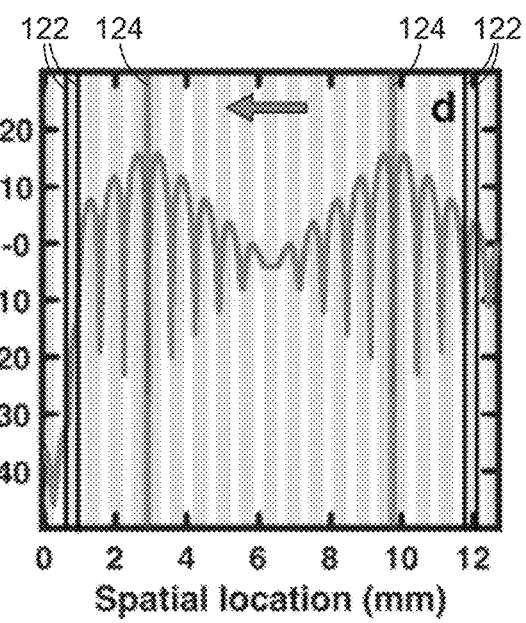

The integrated layered sheet isolator, at normal incidence, achieves insertion loss of 0.04 dB and return loss of 33 dB at the resonance frequency 94.20 GHz (FIG. 12B). The return loss can be further increased by increasing the number of sapphire/quartz bi-layers. Away from the resonance, the layered sheet isolator 30 is highly reflective in either direction. At oblique incidence, the degree of isolation progressively deteriorates with increasing angle of incidence in the same way as for conventional free-space isolators. One way to address this problem is by adding a metallic layer to the layered sheet isolator. The position of the metallic layer should coincide with a nodal plane of the electric component of the resonant field distribution at normal incidence to avoid a significant increase in the insertion loss. At oblique incidence, however, the nodal plane of the electric field distribution can shift away from the metallic layer, thus making the layered sheet isolator 30 highly reflective at any frequency. For this to happen, the nodal plane location must not coincide with the symmetry plane (if any) of the multilayered structure.

The disclosed devices provide several advantages over current polarizers and isolators, particularly in high-power applications. In some embodiments, a layered sheet polarizer in accordance with this disclosure can provide nearly perfect reflectance and negligible absorbance for the undesired input light polarization. In other embodiments, a layered sheet polarizer in accordance with this disclosure can provide nearly perfect absorbance and negligible reflectance for the backward-propagating (reflected) light. In still further embodiments, an asymmetric layered sheet polarizer in accordance with this disclosure can provide nearly perfect reflectance of the undesirable polarization component for the forward-propagating (input) light, while providing nearly perfect absorbance for the undesirable polarization component for the backward propagating (reflected) light.

The invention claimed is:

1. A layered sheet isolator comprising:
a first planar layered sheet polarizer comprising a multilayered structure including multiple planar, transparent, non-dichroic, low-absorption layers including first non-dichroic layers having a relatively high index of refraction and second non-dichroic layers having a relatively low index of refraction, the first and second layers being arranged in an alternating manner within the structure so as to form resonator structures, and a planar dichroic layer positioned within the multilayered structure;
a second planar layered sheet polarizer also comprising a multilayered structure including multiple planar, transparent, non-dichroic, low-absorption layers including first non-dichroic layers having a relatively high index of refraction and second non-dichroic layers having a relatively low index of refraction, the first and second layers being arranged in an alternating manner within the structure so as to form resonator structures, and a planar dichroic layer positioned within the multilayered structure, the second planar layered sheet polarizer having a 45° misalignment relative to the first planar layered sheet polarizer; and
a Faraday rotator positioned between the first and second planar layered sheet polarizers.

2. The layered sheet isolator of claim 1, wherein the Faraday rotator is a 45° Faraday rotator.

3. The layered sheet isolator of claim 1, further comprising a planar metallic layer located at a nodal point of a resonant electric field distribution of the layered sheet isolator configured to reject obliquely incident electromagnetic waves.

4. The layered sheet isolator of claim 3, wherein the metallic layer is a magnetized ferromagnet that provides magnetic Faraday rotation.

5. The layered sheet isolator of claim 3, wherein the isolator comprises multiple planar metallic layers.

6. An asymmetric reflective/absorptive layered sheet polarizer comprising:
a planar multilayered structure including:
multiple planar, transparent, low-absorption layers including first planar, non-dichroic layers having a relatively high index of refraction and second planar, non-dichroic layers having a relatively low index of refraction, the first and second planar, non-dichroic layers being arranged in an alternating manner within the structure so as to form resonator structures; and
a planar dichroic layer positioned within the multilayered structure, the dichroic layer being positioned within the polarizer such that one of a first linear polarization and a second linear polarization of light input into the polarizer is transmitted by the polarizer in both a forward direction and a rearward direction through the polarizer and the other of the first and second linear polarizations is reflected when propagating in the forward direction through the polarizer and absorbed when propagating in the rearward direction of the polarizer such that the other of the first and second linear polarizations is not transmitted in either direction by the polarizer.

* * * * *